United States Patent
Coffey et al.

(10) Patent No.: US 7,238,135 B2
(45) Date of Patent: Jul. 3, 2007

(54) THREE-MODE CONTINUOUSLY VARIABLE TRANSMISSION WITH A DIRECT LOW MODE AND TWO SPLIT PATH HIGH MODES

(75) Inventors: Dan Coffey, Howell, MI (US); Michael C. Sefcik, Linden, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 216 days.

(21) Appl. No.: 11/144,161

(22) Filed: Jun. 3, 2005

(65) Prior Publication Data

US 2006/0276294 A1 Dec. 7, 2006

(51) Int. Cl.
*F16H 37/02* (2006.01)

(52) U.S. Cl. ............... 475/210; 475/211; 475/218; 475/219

(58) Field of Classification Search ........ 475/210–213, 475/218, 219
See application file for complete search history.

(56) References Cited

U.S. PATENT DOCUMENTS

| | | | | |
|---|---|---|---|---|
| 4,793,217 A | * | 12/1988 | Morisawa et al. ............ | 477/41 |
| 4,836,049 A | * | 6/1989 | Moan ............................ | 475/52 |
| 4,990,127 A | * | 2/1991 | Roberts et al. ............. | 475/211 |
| 5,092,434 A | * | 3/1992 | Smith .......................... | 477/39 |
| 5,803,859 A | * | 9/1998 | Haka ........................... | 475/211 |
| 5,916,053 A | * | 6/1999 | McCarrick et al. .......... | 475/211 |
| 5,931,760 A | * | 8/1999 | Beim et al. ................... | 475/211 |
| 5,941,789 A | * | 8/1999 | McCarrick et al. .......... | 475/214 |
| 5,961,414 A | * | 10/1999 | Beim et al. ................... | 475/212 |
| 5,980,414 A | * | 11/1999 | Larkin ......................... | 475/211 |
| 6,093,125 A | * | 7/2000 | McCarrick et al. .......... | 475/210 |
| 6,106,428 A | * | 8/2000 | Koneda et al. ............. | 475/210 |
| 6,561,942 B2 | * | 5/2003 | Wehking ...................... | 475/216 |

* cited by examiner

*Primary Examiner*—Tisha Lewis
(74) *Attorney, Agent, or Firm*—Christopher DeVries

(57) ABSTRACT

A powertrain includes a continuously variable transmission having a starting mechanism, a continuously variable unit (CVU), and a pair of planetary gear arrangements. The continuously variable transmission also includes a plurality of torque transmitting mechanisms which are selectively engageable in combinations of two to establish a reverse mode of operation between the starting mechanism and a transmission output shaft, a low direct mode of operation, an intermediate split mode of operation, and a high split mode of operation.

6 Claims, 2 Drawing Sheets

THREE-MODE CONTINUOUSLY VARIABLE TRANSMISSION WITH A DIRECT LOW MODE AND TWO SPLIT PATH HIGH MODES

TECHNICAL FIELD

This invention relates to power transmissions and, more particularly, to continuously variable power transmissions having a continuously variable unit disposed to operate with a planetary gear arrangement.

BACKGROUND OF THE INVENTION

Passenger vehicles in today's market incorporate a power transmission that has at least three forward ratios, and quite often, six forward ratios. These power transmissions are utilized to extend the operating range of the vehicle engine by reusing the engine speed range as the gear ratio is changed. In order to make more efficient use of the engine and its speed range, it has been proposed to employ a continuously variable type transmission wherein the ratio change within the transmission is continuous over during a drive range during which the engine speed might be held constant. For example, the continuously variable transmission ratios are changed from an underdrive of four to one (4:1) to an overdrive of point four to one (0.40:1). A step change transmission utilizing this same ratio spread would require five or six ratio steps depending upon the step ratio multiplier desired between the adjacent ratios.

The continuously variable type transmissions have been suggested as single mode and dual mode type power transmissions. Mostly, the transmissions for passenger vehicles have been proposed as geared neutral type transmission arrangements wherein the ratios in the transmission can be changed from forward to reverse without the interchange of friction devices. While these types of transmissions provide a simplified control system for forward and reverse, they do have the disadvantage in that a high portion of the power is recirculated through the continuously variable unit and the gearing during the vehicle launch operation. This reduces the transmission output torque, tractive effort, and the overall efficiency of the transmission during vehicle launch.

SUMMARY OF THE INVENTION

It is an object of the present invention to provide an improved three-mode continuously variable transmission.

In one aspect of the present invention, a continuously variable unit is incorporated in the transmission with two planetary gearsets to provide a three-mode continuously variable transmission.

In another aspect of the present invention, the continuously variable transmission has a plurality of selectively engageable torque transmitting mechanisms, which establish the drive modes within the transmission.

In yet another aspect of the present invention, the torque transmitting mechanisms are engaged in combinations of two to establish a reverse ratio as well as the three forward modes.

In still another aspect of the present invention, the reverse mode and the low forward mode are both direct modes having all of the power passing through the continuously variable unit prior to being introduced into the planetary gearsets.

In yet still another aspect of the present invention, two high forward modes of operation are both split drive modes wherein a portion of the power from an engine passes through a mechanical path and another portion of the power passes through the continuously variable unit.

In a further aspect of the present invention, at least two of the torque transmitting mechanisms provide both a one-way drive torque transmitter and a two-way frictional drive torque transmitter.

In a yet further aspect of the present invention, two of the torque transmitting mechanisms are stationary type torque transmitting mechanisms, commonly termed brakes, and two of the torque transmitting mechanisms are rotating type torque transmitting mechanisms, commonly termed clutches.

DESCRIPTION OF THE EXEMPLARY EMBODIMENT

Figure 1:
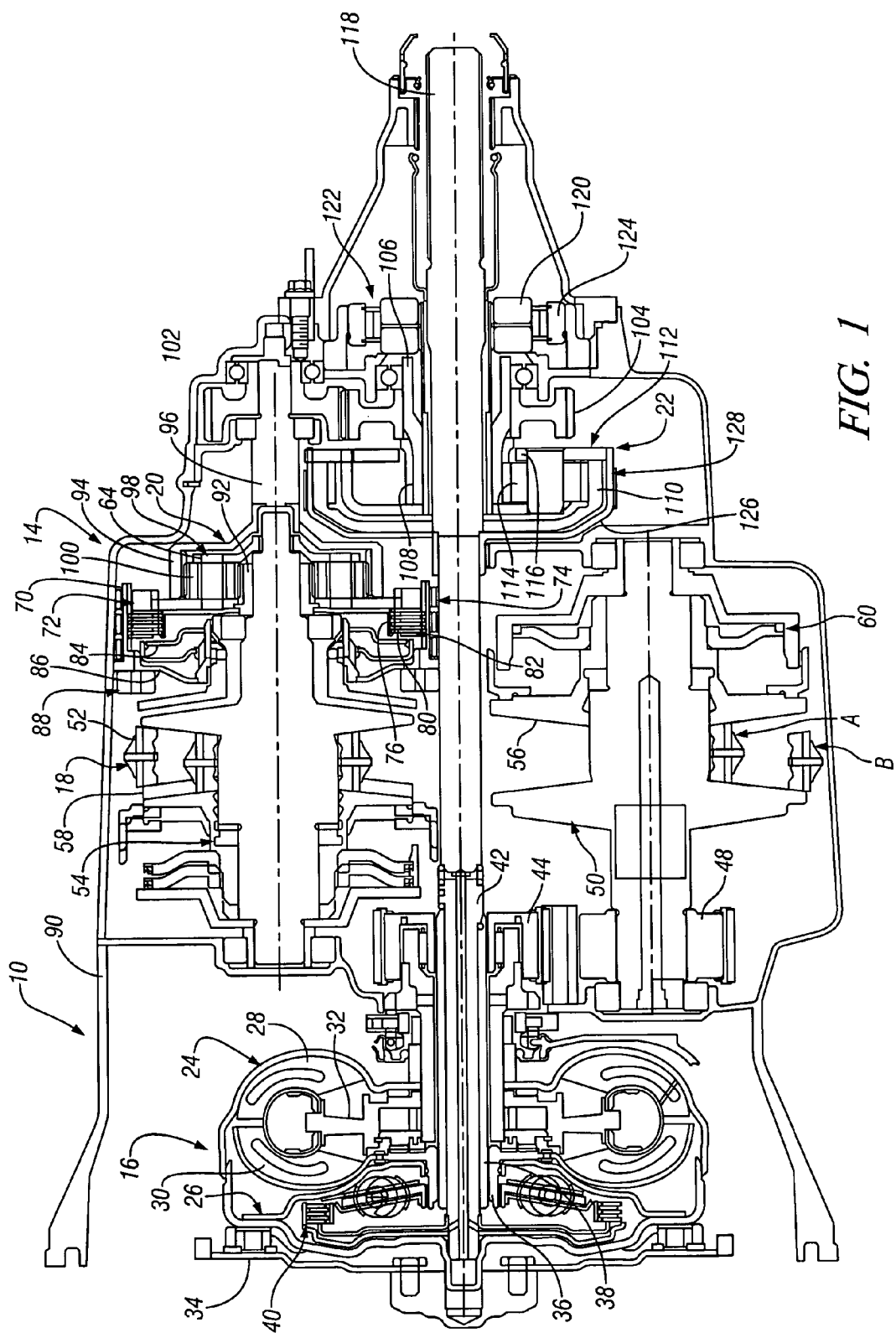
FIG. 1 is a cross-sectional elevational view of a powertrain having a three-mode transmission incorporating the present invention.
Figure 2:
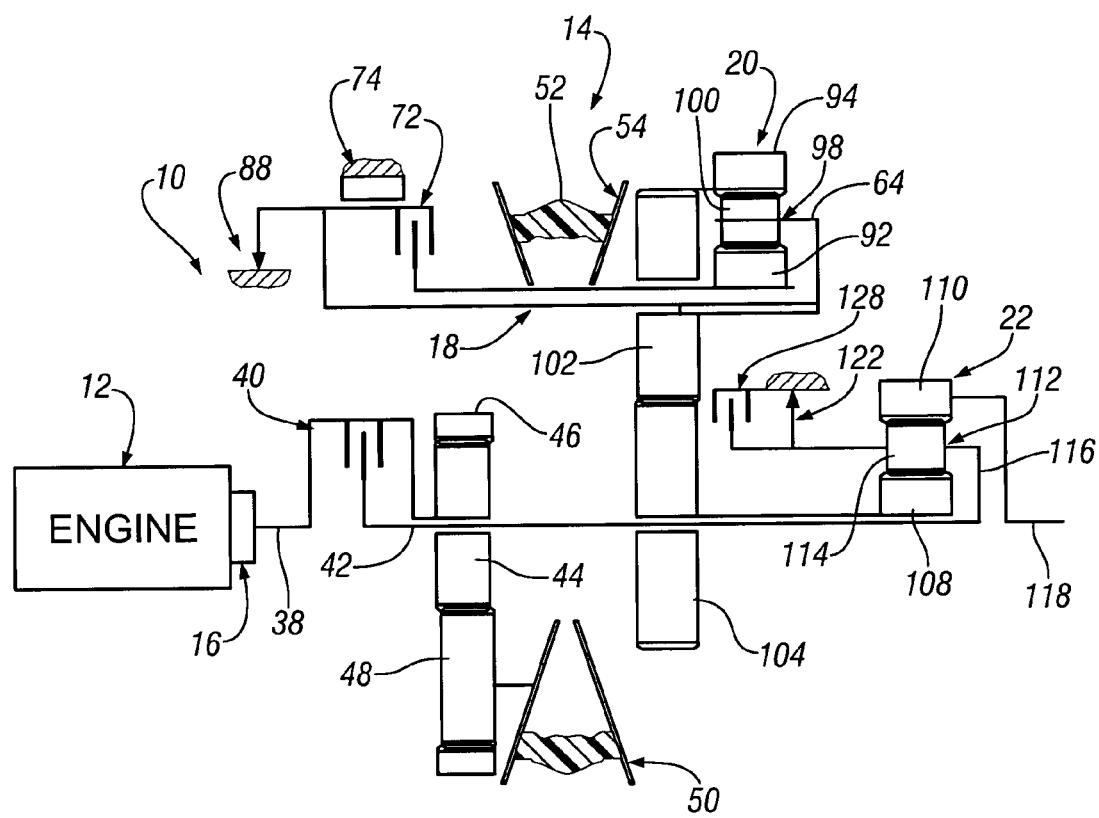
FIG. 2 is a schematic representation of the powertrain shown in FIG. 1.

Referring to the drawings, wherein like characters represent the same or corresponding parts throughout the several views, there is seen in FIGS. 1 and 2 a powertrain 10 having an engine or other conventional mechanical power source 12, and a continuously variable ratio transmission (CVT) 14. The CVT 14 includes a starting device or mechanism 16, a continuously variable unit (CVU) 18, a first planetary gearset or arrangement 20, and a second planetary gearset or arrangement 22.

The starting device 16 is shown as a conventional torque converter 24 and torque converter clutch 26. The torque converter 24 includes an impeller 28, a turbine 30, and a stator 32. The impeller 28 is continuously connected with the engine 12 through a flex plate 34. The turbine 30 and torque converter clutch 26 are drivingly connected through a hub 36 with an input shaft 38. Also disposed between the torque converter 24 and the flex plate 34 is a selectively engageable torque transmitting mechanism or clutch 40. The clutch 40 selectively connects the output of the hub 36 with a shaft 42.

The input shaft 38 is drivingly connected with a sprocket 44, which is drivingly connected through a chain 46 with another sprocket 48. The sprocket 48 is drivingly connected with a variable diameter sheave or pulley 50, which is a member of the CVU 18. The sheave 50 is drivingly connected through a conventional flexible belt 52 with a variable diameter sheave or pulley 54, which is also a component of the CVU 18. Each of the sheaves 50 and 54 has a movable half sheave 56 and 58, respectively. These sheaves, as is well known, are controlled in axial movement by respective hydraulic motors 60 and 62. As the sheaves are moved axially, the belt 52 is transported from one diameter along the sheave 58 to another and likewise transported along the sheave 50 between two diameters.

The belt 52, shown in the position A, is at a maximum underdrive condition which means that the sheave 54 will rotate slower than the sheave 50. Thus, the input speed from the input shaft 38 is reduced between the two pulleys. When the belt 52 is in the position B, the CVU 18 is at a maximum overdrive condition wherein the pulley 54 rotates faster than the pulley 50, thereby creating a speed increase or step-up between the shaft 38 and the pulley 54.

A planet carrier 64, which is a component of the planetary gearset 20, is drivingly connected with a hub 70, which is a component of a rotating type torque transmitting mechanism 72 and also a component of a stationary type torque transmitting mechanism 74. The rotating type torque transmitting mechanism 72 is a conventional fluid-operated clutch having an inner hub 76 and a plurality of friction plates and clutch plates 80 and 82, respectively, which are splined between the hub 76 and the hub 70, respectively.

The clutch is engaged and disengaged through the operation of a fluid-operated piston 84, which is slidably disposed in a housing 86 that is secured to the hub 70. Operatively connected with the housing 86 is a one-way torque transmitting mechanism 88, which is operative between a transmission casing or housing 90 and the housing 86 to hold the hub 70 and therefore the carrier 64 stationary in one direction of rotation. The stationary torque transmitting mechanism 74 is a conventional band type brake which is operable by a conventional servo system, not shown, and will when operated hold the planet carrier 64 stationary during both directions of rotation.

The hub 76 is secured to or otherwise drivingly connected with the sheave 54 and a sun gear member 92, which is a component of the planetary gearset 20. Planetary gearset 20 also includes a ring gear member 94, which is drivingly connected with or otherwise secured to a shaft 96. The planetary gearset 20 also includes a planet carrier assembly member 98, which is comprised of the planet carrier 64 and a plurality of pinion gears 100 that are rotatable mounted on the carrier 64 and disposed in meshing relationship with the sun gear member 92 and the ring gear member 94.

The shaft 96 is drivingly connected with a transfer gear 102, which is disposed in meshing relationship with a transfer gear 104. The transfer gear 104 is drivingly connected through a shaft 106 through a sun gear member 108, which is a component of the planetary gearset 22. The planetary gearset 22 also includes a ring gear member 110 and a planet carrier assembly member 112. The planet carrier assembly member 112 has a plurality of pinion gears 114 that are rotatably mounted on a planet carrier 116 and disposed in meshing relationship with both the sun gear member 108 and the ring gear member 110. Both the planetary gearsets 20 and 22 are what are termed simple planetary gearsets in that they have a single set of meshing pinions between the respective sun gear members and ring gear members.

The planet carrier 116 is drivingly connected with the shaft 42 and therefore the torque transmitting mechanism 40. The ring gear member 110 is drivingly connected with a transmission output shaft 118. The planet carrier 116 is drivingly connected with an inner race 120 of a selectively operable conventional one-way torque transmitting mechanism 122. The torque transmitting mechanism 122 has an outer race 124, which is selectively engageable with the transmission housing 90.

As is well known, the selectively engageable one-way torque transmitting mechanism 122 can be controlled to permit clockwise rotation while preventing counterclockwise rotation, and likewise can be controlled to permit counterclockwise rotation while preventing clockwise rotation. Thus, the planet carrier assembly member 112 can be restrained from clockwise rotation while permitting counterclockwise rotation, and also be prevented or restrained from counterclockwise rotation while permitting clockwise rotation.

When the selectively engageable torque transmitting mechanism 40 is engaged, the planet carrier 116 will rotate in unison with the flex plate 34 and therefore be rotated at the speed of the engine 12.

The planet carrier 116 is connected with the shaft 42 through a hub 126, which is surrounded by a selectively engageable stationary type torque transmitting mechanism 128. The torque transmitting mechanism 128 is in the form of a single wrap brake band, which is selectively operated by a conventional hydraulic servomechanism, not shown. When the torque transmitting mechanism 128 is selectively engaged, the planet carrier 116 is restrained from rotation in both directions of operation.

The controlled engagement of the torque transmitting mechanisms will control the transmission 14 to operate in a reverse mode, a first low mode, an intermediate split mode, and a high split mode. During both the reverse mode and the low mode, the transmission 14 is in a direct drive condition wherein all of the power from the engine 12 is transmitted through the CVU 18 while during both of the high split modes, a portion of the power is transmitted from the engine 12 to the shaft 42 while another portion of the power is transmitted through the CVU 18.

To establish the reverse mode of operation, the torque transmitting mechanism 74 and the torque transmitting mechanism 128, or in the alternative, the torque transmitting mechanism 122 are engaged. During the reverse mode of rotation, the sun gear member 92 is rotated in the same direction as the rotation of the engine 12. The carrier 64 is held stationary therefore the ring gear member 94 rotates in an opposite direction to the engine 12. The rotation of the ring gear member 94 is transmitted through the transfer gears 102 and 104 such that the sun gear member 108 rotates in the same direction as the engine 12. The planet carrier 116 is held stationary resulting in reverse rotation of the output shaft 118. The speed of the output shaft 118 can be controlled by controlling the speed of the engine 12 as well as controlling the ratio of the CVU 18. Generally during operation, the engine 12 is set at a maximum common speed while the belt 52 is adjusted from the position A to the position B which results in a speed change between the engine 12 and the output shaft 118.

The torque transmitting mechanism 128 is engaged whenever it is desirable to have engine braking, since the one-way torque transmitting mechanism 122 will permit the vehicle to coast in the reverse direction without transmitting torque back to the engine 12.

The forward low range of operation is established with the engagement of the torque transmitting mechanism 72 and the selective positioning of the outer race 124 of the torque transmitting mechanism 122. The torque transmitting mechanism 128 may also be engaged during the low mode of operation. During the low mode of operation, the variable sheave 54 and the planetary gearset 20 rotate in unison. The torque transmitting mechanism 72 assures that this will occur since it directly connects the planet carrier 64 with the sun gear member 92. The transfer gears 102 and 104 reverses the rotation of the sheave 54 such that the rotation direction is opposite to that of the engine 12. However, the planet carrier 116 is held stationary such that the ring gear member 110 and the output shaft 118 rotate in a direction the same as the engine.

The output speed in the low mode is controlled by the engine speed as well as the ratio of the CVU 18. As with the case in reverse, the CVU 18 begins at the maximum underdrive position A and progresses toward the maximum overdrive position B, while the engine speed is held at a constant value. However, if desirable, the engine speed can be changed during this operation. When the ratio of the CVU 18 is at the maximum overdrive position B, the output shaft 118 will be operating at apporoximately the same speed as the output of the engine 12.

At this point, the torque transmitting mechanism 40 is engaged and the one-way torque transmitting mechanism 122 is disengaged. The torque transmitting mechanism 72 is released thus causing the one-way torque transmitting mechanism 88 to become active which prevents forward rotation of the planet carrier 64. Thus, the sun gear member 92, which is driven by the CVU 18, enforces reverse rotation of the ring gear member 94 resulting in forward rotation of the sun gear member 108.

With the engagement of the torque transmitting mechanism 40, the planet carrier 116 is driven directly at the speed of the engine 12. The speed of the output shaft 118 is approximately constant when shifting between the low direct mode and the intermediate mode. It is also a double transition shift, that is, two selectively engageable devices are disengaged while two other selectively engageable devices are engaged. The use of the one-way torque transmitting mechanisms provides for a smooth double transition interchange. During the interchange, the torque transmitting mechanism 40 is engaged while the torque transmitting mechanism 72 is disengaged.

The speed of the output shaft 118 is increased during the intermediate mode of operation by continuing to change the ratio of the CVU from essentially a direct drive, which occurred at the interchange beginning at the overdrive position B and progressing toward the underdrive position A. When the ratio of the CVU 18 reaches the maximum under drive position A, the transmission is shifted or has a ratio interchange from the intermediate mode to a high mode of operation. During the high mode of operation, the torque transmitting mechanism 72 is engaged and the torque transmitting mechanism 88 is released. The interchange from intermediate to high is a nonsynchronous interchange; however, this interchange is accommodated by the use of the one-way torque transmitting mechanism 88.

During the high mode of operation, the planetary gearset 20 is rotated as a single unit resulting in the sun gear member 108 being driven in a direction opposite to the direction of the engine 12. During the high mode of operation, it is again possible to hold the engine speed at a fixed value while the ratio of the CVU 18 is changed from a ratio at the interchange toward a further overdrive condition. As the ratio of the CVU 18 changes toward an overdrive condition, the speed of the sun gear member 108 is increased in the reverse direction which will result in an increase of the speed of the ring gear member 110 and therefore the output shaft 118 in a positive or engine rotation direction.

From the above description, it should now be apparent that the reverse mode of operation and the low mode of operation are both direct drive modes. That is, all of the power from the engine is transmitted through the CVU to the output shaft 118. The two high modes, first the intermediate mode and then the high mode of operation, are both split path operations wherein a portion of the power is transmitted directly from the engine through the shaft 42 to the planet carrier 116, and a portion of the power is transmitted through the CVU 18 to the sun gear member 108. Thus, the two high modes of operation are split path modes which reduce the torque transmission through the CVU 18. These split path modes of operation are more efficient than the direct path mode of operation.

It should be noted that the use of the three modes of operation also provides for a narrow ratio change within the CVU during any one of the modes of operation. It should now be apparent to those skilled in the art that during the entire operating spectrum, the CVU ratio is changing from an underdrive condition to an overdrive condition, and the speed of the output shaft is continually increased during this operation.

Obviously, many modifications and variations are possible in light of the above disclosure. Therefore, it should be understood that the invention is only to be limited by the scope of the appended claims.

The invention claimed is:

1. A powertrain having a three-mode continuously variable transmission with a direct low mode and two split path high modes comprising:
   input means for delivering power to said continuously variable transmission;
   a transmission housing;
   output means for delivering power from said continuously variable transmission;
   a continuously variable unit having an input member continuously interconnected with said input means and an output member;
   a first planetary gear arrangement having a first member continuously interconnected with said output member, a second member, and a third member;
   a second planetary gear arrangement having a first member continuously interconnected with said second member of said first planetary gear arrangement, a second member continuously interconnected with said output means, and a third member;
   a first torque transmitting mechanism for selectively interconnecting said third member of said second planetary gear arrangement with said transmission housing;
   a second torque transmitting mechanism operable to interconnect two of said members of said first planetary gear arrangement;
   a third torque transmitting mechanism operable to continuously interconnect said third member of said first planetary gear arrangement with said transmission housing;
   a fourth torque transmitting mechanism operable to selectively interconnect said input means and said third member of said second planetary gear arrangement; and
   said torque transmitting mechanisms being operable in combinations of two to establish three forward modes and one reverse mode between input means and said output means.

2. The powertrain having a three-mode continuously variable transmission with a direct low mode and two split path high modes defined in claim 1 further comprising:
   said continuously variable unit being varied from an underdrive condition to an overdrive condition during said three forward modes of operation.

3. The powertrain having a three-mode continuously variable transmission with a direct low mode and two split path high modes defined in claim 1 further comprising:
   said first torque transmitting mechanism including a two-way frictional torque transmitting mechanism and a one-way torque transmitting mechanism; and
   said third torque transmitting mechanism including a two-way frictional torque transmitting mechanism and a one-way torque transmitting mechanism.

4. The powertrain having a three-mode continuously variable transmission with a direct low mode and two split path high modes defined in claim 1 further comprising:

said input means including a mechanical power source; and a starting mechanism disposed between said mechanical power source and said input member of said continuously variable unit.

5. The powertrain having a three-mode continuously variable transmission with a direct low mode and two split path high modes defined in claim 4 further comprising:

said starting mechanism including a torque converter and a torque converter clutch; and said fourth torque transmitting mechanism being connectable between said mechanical power source and said third member of said second planetary gear set in series drive relation with said torque converter clutch and in by passing relation with said torque converter of said starting mechanism.

6. The powertrain having a three-mode continuously variable transmission with a direct low mode and two split path high modes defined in claim 1 further comprising:

said first member of said first planetary gear arrangement being a sun gear member, said second member of said first planetary gear arrangement being a ring gear member, and said third member of said first planetary arrangement being a planet carrier assembly member; and said first member of said second planetary gear arrangement being a sun gear member, said second member of said second planetary gear arrangement being a ring gear member, and said third member of said second planetary gear arrangement being a planet carrier assembly member.

* * * * *